May 29, 1951 A. RAPPL 2,554,922
WINDOW OPERATOR
Filed Jan. 5, 1946 2 Sheets-Sheet 1

INVENTOR
Anton Rappl
BY
Beau, Brooks, Buckley, & Beau
ATTORNEYS

May 29, 1951  A. RAPPL  2,554,922
WINDOW OPERATOR
Filed Jan. 5, 1946  2 Sheets-Sheet 2

INVENTOR
Anton Rappl
BY
Beau, Brooks, Buckley + Beau.
ATTORNEYS

Patented May 29, 1951

2,554,922

UNITED STATES PATENT OFFICE 2,554,922

WINDOW OPERATOR

Anton Rappl, Eggertsville, N. Y., assignor to Trico Products Corporation, Buffalo, N. Y.

Application January 5, 1946, Serial No. 639,180

4 Claims. (Cl. 268—109)

This invention relates to window operators for automobiles and more particularly to a mechanism by which the rear window may be opened and closed to provide for proper ventilation.

In the modern streamlined automobile with its rearwardly and downwardly sloping top the rear window is disposed with a like inclination so that it becomes more desirable for the comfort of the passengers that the window be adjustable to ventilate the low ceiling in the passenger compartment.

The primary object of the present invention is to provide a practical means of regulating the rear window by which proper ventilation may be obtained.

A further object is to provide a window operator of simple and durable construction which will be efficient in operation and serve to secure the window in a closed position against unauthorized opening from without.

The following description will make clear the foregoing and other objects, reference being had to the accompanying drawings wherein.

Figure 2:
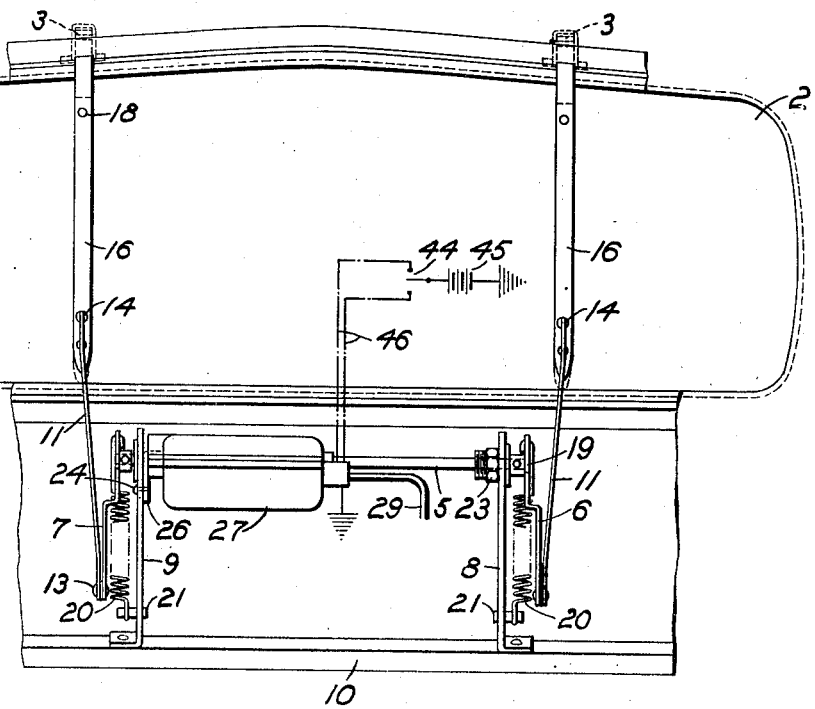
Fig. 2 is an inside elevation looking through the rear window and more clearly showing the operating mechanism.

Referring more particularly to the drawings, the numeral 1 designates the rearwardly sloping portion of a streamlined vehicle having the slanting rear window 2 mounted for opening and closing movement. The window may be slidably mounted, but for purposes of illustration it has been shown as being supported along its upper edge by hinges 3 so that the lower edge of the window may be swung outwardly, as indicated at 4, into the air stream flowing downwardly over the rear portion of the vehicle when in travel. The operator comprises a rock shaft 5 having a pair of rocker arms 6 and 7 fixed thereon, the shaft being journaled on mounting brackets 8 and 9 suitably mounted upon a frame member 10 of the vehicle structure. Connecting the outer ends of the rocker arms to the window are the links 11 which serve to prop the window when the latter is in opened position and to act in tension for urging the window firmly to its seat 12 when the window is closed. The inner end of each link 11 is pivotally connected to the outer end of its adjacent rocker arm 6 by a pin 13 while the outer end of the link is pivotally connected to a window carried ear 14 by a pivot pin 15. In order to relieve the glass panel 2 from unnecessary stress the latter is embraced between inner and outer stays 16 and 17 which may constitute extensions from the glass carried parts of the mounting hinges 3, as shown in Fig. 2. The stays may be firmly united by fasteners 18, the latter serving additionally to anchor the ears 14 in place.

Figure 3:
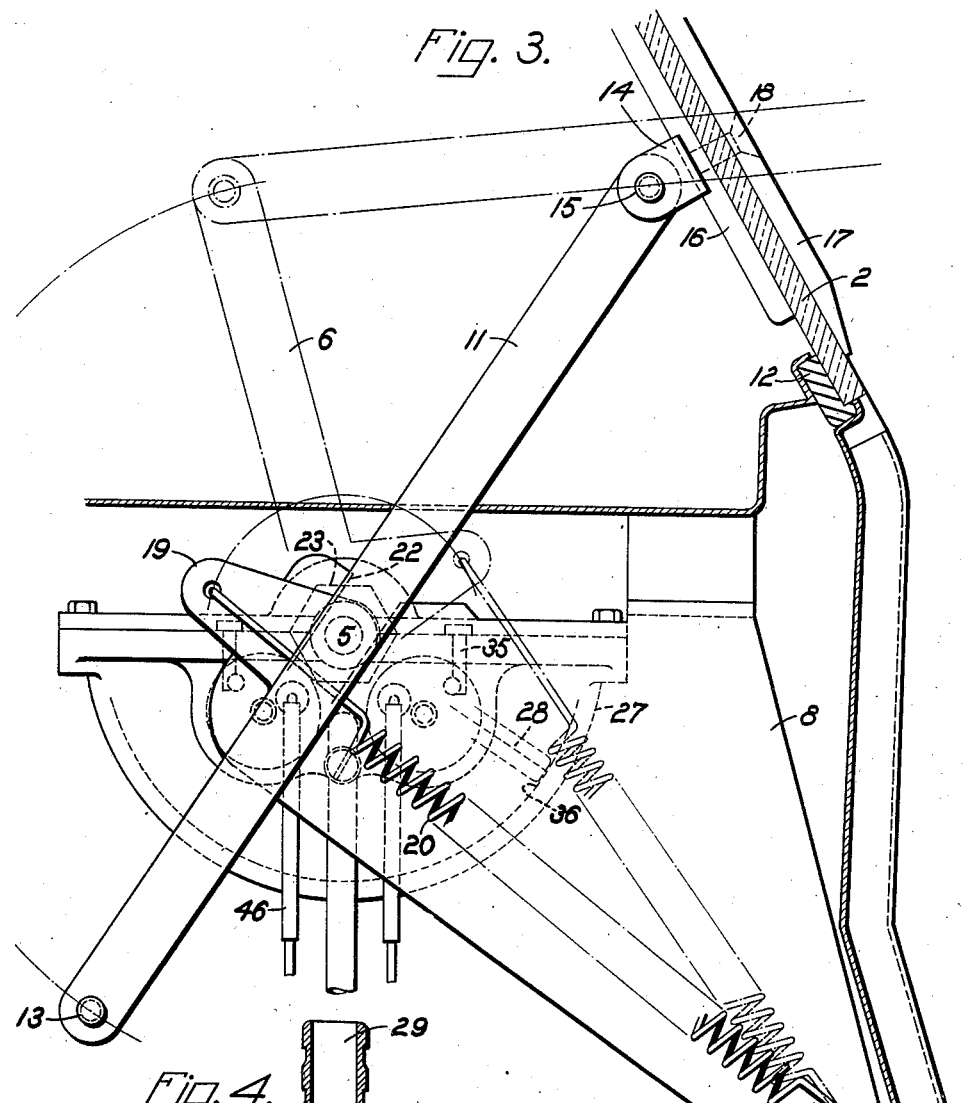
Fig. 3 is an enlarged view in side elevation of the window operator, with portions of the vehicle body shown in fragment.
Figure 4:
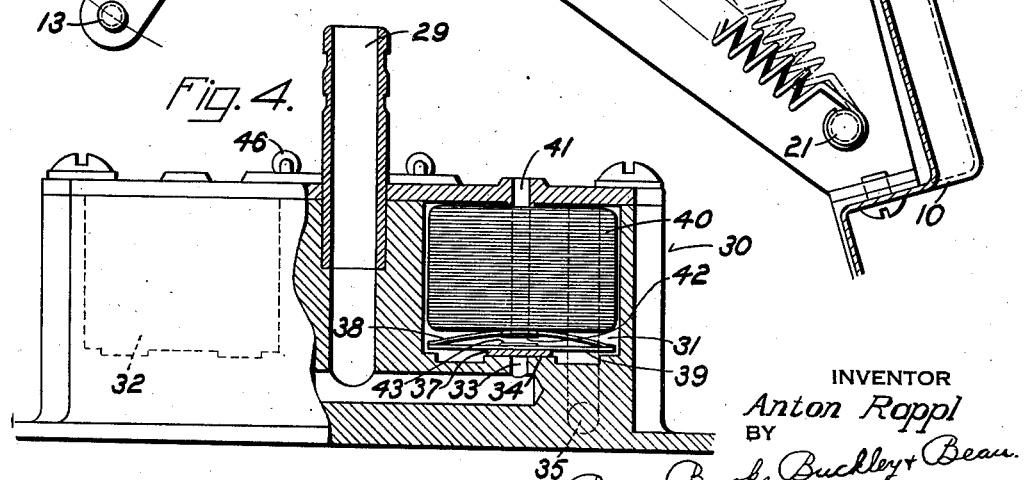
Fig. 4 is a detailed view through the control valve.

Also fixed on the rocker shaft 5 adjacent each rocker arm 6 is a second arm 19 to which one end of a tension spring 20 is fastened, the opposite end of the spring being anchored by a pin 21 to the adjacent shaft supporting bracket 8, 9. The rocker arm together with the spring connected arm 19 may be in the form of a bell crank unit, the location of the arm 19 being such that the line of spring force will move across the longitudinal axis of the shaft when the window is moved to or from its closed position. Referring to the enlarged showing of Fig. 3 it will be noticed that in the closed position of the window the links 11 are disposed on dead center with respect to the shaft axis. Consequently the window is thereby locked against unauthorized attempts to open it from without. It will also be noticed that in this closed position, as shown by the solid lines, that the spring 20 is acting on the shaft in a counterclockwise direction and serving to resiliently hold the links in such window locking position wherein the window panel is firmly engaged with its rubber seat 12. Again, when the window is moved to an open position and the spring passes across the axis of the shaft it will then act upon the shaft in a clockwise direction and give resilient but yielding support to the window in its opened position. This is obvious from the dot and dash lines in Fig. 3 which disclosed the rocker arm 6 displaced quite a bit from the full line position wherein the rocker arms are concealed beneath the registering links 11.

Figure 5:
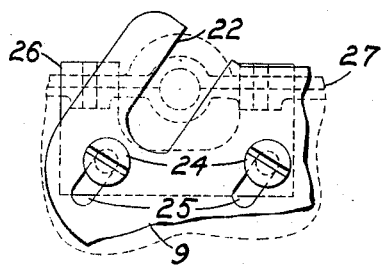
Fig. 5 is a detailed view of the motor mounting.
Figure 1:
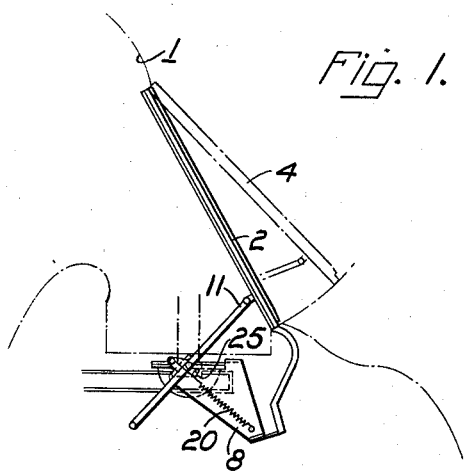
Fig. 1 is a fragmentary phantom view of the rear portion of a motor vehicle showing the rear window operator incorporated therein.

In order to bring the window into firm engagement with the seat 12, the mounting brackets 8, 9, are formed with slots 22 extending in the direction of the rocker arms 6 when in a window closed position. By sliding the shaft 5 laterally along the slots 22 and away from the window opening, and then tightening them, as by a clamp nut 23, the window may be brought into firm engagement with its seat. In addition to the clamp nut 23, set screws 24 may be engaged in inclined slots 25 on the bracket 9 for securing a motor supporting plate 26, as shown in Figs. 1 and 2.

From the foregoing it will be observed that the rock shaft may be adjusted to close the window firmly on its seat. Furthermore, the linkage which operatively connects the rock shaft to the window serves as a means for securely locking the window in its closed position and that the spring is made to function in a dual capacity by having it shift across the shaft axis. As the window is being elevated to its open position, the spring will assist by imparting a clockwise window opening urge, but when the window is being brought through the final portion of its closing movement the spring urge on the shaft will be counterclockwise.

According to the illustrated embodiment, the window operator is of the motor driven type and may consist of a simple suction operated motor having a semi-cylindrical casing 27 with a chamber in which a piston-like vane 28 is oscillated. The vane is fixed on the rock shaft 5 and therefore constitutes the motor shaft with the opposite ends of the latter projecting beyond the opposite ends of the motor chamber 36 for supporting the rocker arms 6 and 7. The motor is connected to a source of suction through a nipple 29 which opens through a control valve generally shown at 30. The passage from nipple 29 branches into chambers 31 and 32, opening into the latter through ports 33 provided in the valve seat 34. From each chamber extends a passage 35 establishing communication with the motor chamber 36 at one side or the other of the piston 28. The ports 33 are normally closed by a valve 37 which is urged to its seat by a spring 38. The valve 37 is carried by an armature 39 adapted to be attracted by an electro-magnet 40 for opening the port 33 to the chamber 31 or 32. A venting port 41 opens through a seat 42 in opposition to each seat 34 and normally vents its valve chamber to the atmosphere. Consequently, the motor chamber 36 is normally open to the atmosphere. However, when the armature 39 is attracted by the magnet to unseat the valve 37, a valve part 43 carried by the armature will seat over the port 41 to close off the atmosphere. The electromagnets will be selectively energized by a switch generally indicated at 44 and connected in circuit with a source of energy 45 as shown in Fig. 2 by the wires 46.

When the switch 44 is selectively manipulated, the corresponding electro-magnetic valve will be actuated to open the suction port 33 to the corresponding side of the motor chamber 36 whereupon the pressure differential acting upon the piston 28 will rotate the shaft 5 a predetermined extent for the desired window adjustment, the spring 20 assisting the motor at critical moments of motor operation.

The rear window operator is simple in construction and practical in design and while it is shown applied to a swinging type window, the window panel could be otherwise mounted. This and other changes in construction and design may be resorted to since the inventive principles may assume other physical embodiments without departing from the spirit of the invention and the scope of the appended claims.

What is claimed is:

1. A window operator for motor vehicles comprising a window panel mounted for movement to and from a closed position, a shaft journaled on the vehicle and having an arm fixed thereon, a motor chamber through which the shaft extends, a piston-like vane operating in the chamber and fixed to the shaft for applying fluid pressure impulses directly to the shaft, a link pivotally connecting the outer end of the arm to the window, the arm and link being normally disposed substantially across the axis of shaft rotation when the panel is in a closed position whereby to lock the panel in such position, a spring anchored at one end on the vehicle and having its opposite end connected to the arm for urging the shaft toward a window closing position when the panel is moving onto its seat and acting to urge the shaft in a window opening direction when the window is moved away from its seat, the point of connection of the spring with the arm being such that the line of spring force will shift across the axis of rotation with increased tension during the final portion of the movement of the panel to its seat.

2. A window having a panel mounted for opening and closing movement, a shaft journaled substantially parallel to the panel, a rocker arm fixed to each end of the shaft and connected to the panel by a link for opening and closing the latter when the shaft is rocked in one direction or the other with the link moving in effect across the pivotal axis of the shaft as the panel closes, spring means normally acting on the shaft to urge it in a panel closing direction as the panel approaches its closed position, the shaft having a fixed part to which the spring means are connected and which itself carries the line of spring force across the pivotal axis, such line of spring force lying closer to the pivotal axis when the panel is closed than when it is opened to reduce the effective leverage through which the spring means functions, and means for rocking the shaft, said last named means being in the form of an air motor having a quadrant shaped chamber through which the shaft extends and a piston-like vane fixed on the shaft within the chamber.

3. A window having a panel, hinge means mounting the panel for opening and closing movement, a shaft journaled substantially parallel to the hinge axis of the panel and having a rocker arm fixed to an end thereof, a link connecting the arm to the panel at a point spaced from the hinge axis for opening and closing the window when the shaft is rocked in opposite directions, a motor chamber in which the shaft is journaled, a vane-like piston fixed on the shaft within the chamber and operable back and forth by reverse applications of fluid pressure differential thereon, the arm and link being normally disposed substantially across the axis of shaft rotation when the panel is in a closed position whereby to lock the panel in such position, a coiled spring anchored at one end on the vehicle and having its opposite end connected to the arm for urging the shaft toward a window closing position when the panel is moving onto its seat and acting to urge the shaft in a window opening direction when the window is moved away from its seat, the point of connection of the spring with the arm being such that the line of spring force will shift across the axis of rotation with increased tension during the final portion of the movement of the panel to its seat, and means selectively applying a fluid pressure differential to the piston.

4. A window operator for motor vehicles comprising a window panel hinged at its upper edge for movement to and from a closed position, a shaft journaled on the vehicle and having an arm fixed thereon, a link pivotally connecting the outer end of the arm to the window, said arm having a bell crank extension to which one end of a coiled tension spring is connected, the opposite end of the spring being anchored to a fixed part of the vehicle, said bell crank extension serving to shift its spring end across the axis of shaft rotation for urging the shaft first in one direction and then in the opposite direction, the line of spring force being closer to the shaft axis when in a panel closed position than in a panel opened position to reduce the panel opening effort required, and means for rocking the shaft, said last named means being in the form of an air motor having a quadrant shaped chamber through which the shaft extends and a piston-like vane fixed on the shaft within the chamber.

ANTON RAPPL.

REFERENCES CITED

The following references are of record in the file of this patent:

UNITED STATES PATENTS

| Number | Name | Date |
|---|---|---|
| 309,599 | Braud | Dec. 23, 1884 |
| 396,357 | Finnegan | Jan. 15, 1889 |
| 463,141 | Dickson | Nov. 17, 1891 |
| 1,688,227 | King | Oct. 23, 1928 |
| 2,023,699 | Robinson | Dec. 10, 1935 |
| 2,140,865 | Tuttle | Dec. 20, 1938 |
| 2,159,516 | Ball | May 23, 1939 |
| 2,220,766 | Hubbs | Nov. 5, 1940 |
| 2,280,387 | Dilworth | Apr. 21, 1942 |
| 2,308,057 | Cooley | Jan. 12, 1943 |
| 2,327,064 | Rappl | Aug. 17, 1943 |
| 2,337,632 | Winser | Dec. 28, 1943 |
| 2,436,728 | Parsons | Feb. 24, 1948 |